(12) United States Patent
Girotto et al.

(10) Patent No.: US 9,644,566 B2
(45) Date of Patent: May 9, 2017

(54) CONTROL APPARATUS FOR OPERATING A FUEL INJECTOR

(71) Applicant: GM GLOBAL TECHNOLOGY OPERATIONS LLC, Detroit, MI (US)

(72) Inventors: Marco Girotto, Turin (IT); Valerio Nuzzo, Turin (IT); Angelo Cancellieri, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 214 days.

(21) Appl. No.: 14/494,332

(22) Filed: Sep. 23, 2014

(65) Prior Publication Data
US 2015/0088402 A1 Mar. 26, 2015

(30) Foreign Application Priority Data

Sep. 23, 2013 (GB) .................................. 1316871.1

(51) Int. Cl.
| | | |
|---|---|---|
| *F02D 41/40* | (2006.01) | |
| *F02D 41/12* | (2006.01) | |
| *F02D 41/14* | (2006.01) | |
| *F02D 41/22* | (2006.01) | |
| *F02D 41/24* | (2006.01) | |

(52) U.S. Cl.
CPC .......... *F02D 41/40* (2013.01); *F02D 41/123* (2013.01); *F02D 41/1497* (2013.01); *F02D 41/221* (2013.01); *F02D 41/247* (2013.01); *F02D 41/2416* (2013.01); *F02D 2041/224* (2013.01);

(Continued)

(58) Field of Classification Search
CPC ....... F02D 2041/224; F02D 2200/1002; F02D 2250/31; F02D 41/123; F02D 41/1497; F02D 41/221; F02D 41/2416; F02D 41/2419; F02D 41/247; F02D 41/40;

(Continued)

(56) References Cited

U.S. PATENT DOCUMENTS

| | | |
|---|---|---|
| 4,424,568 A | 1/1984 | Nishimura et al. |
| 6,907,861 B2 * | 6/2005 | Asano ................... F02D 41/123 123/395 |

(Continued)

FOREIGN PATENT DOCUMENTS

| | | |
|---|---|---|
| CN | 102192026 A | 9/2011 |
| GB | 2498783 A | 7/2013 |

(Continued)

*Primary Examiner* — Carlos A Rivera
*Assistant Examiner* — Carl Staubach
(74) *Attorney, Agent, or Firm* — Lorenz & Kopf, LLP.

(57) ABSTRACT

A control apparatus for operating a fuel injector is provided. The control apparatus includes an electronic control unit configured to: identify when the engine is running under a fuel cut-off condition, and then perform a learning procedure to determine an actual value of energizing time that causes the fuel injector to inject a target fuel quantity. The learning procedure provides for the electronic control unit to perform several test injections with different energizing time values and measure an engine torque value caused by the test injection. The measured engine torque values and their correspondent energizing time values are used to extrapolate the actual value of the energizing time as the value that corresponds to a reference value of engine torque that is consistent with the target fuel quantity.

12 Claims, 3 Drawing Sheets

(52) U.S. Cl.
CPC .. *F02D 2200/1002* (2013.01); *F02D 2250/31* (2013.01); *Y02T 10/44* (2013.01)

(58) Field of Classification Search
CPC .... F02D 41/222; F02D 41/22; F02D 41/1495; Y02T 10/44
USPC ......... 701/101–105, 110, 112, 114; 123/325, 123/326, 198 F, 198 DB, 198 D, 445, 123/446, 447, 456, 457, 478, 480, 493, 123/494, 497, 511; 73/114.11, 73/114.13–114.15, 114.24, 114.25, 73/114.45, 114.49
See application file for complete search history.

(56) References Cited

U.S. PATENT DOCUMENTS

| | | | | |
|---|---|---|---|---|
| 7,363,912 | B2* | 4/2008 | Asano | F02D 41/045 |
| | | | | 123/436 |
| 7,596,992 | B2* | 10/2009 | Asano | F02D 41/2467 |
| | | | | 123/486 |
| 7,845,343 | B2* | 12/2010 | Imai | F02D 41/1497 |
| | | | | 123/198 F |
| 7,891,337 | B2* | 2/2011 | Takeuchi | F02D 41/1497 |
| | | | | 123/436 |
| 2003/0200957 | A1* | 10/2003 | Shinogle | F02D 41/365 |
| | | | | 123/480 |
| 2006/0090733 | A1* | 5/2006 | Fujii | F02D 41/2438 |
| | | | | 123/446 |
| 2008/0308065 | A1* | 12/2008 | Imai | F02D 41/1497 |
| | | | | 123/299 |
| 2011/0224888 | A1* | 9/2011 | Girotto | F02D 41/123 |
| | | | | 701/103 |
| 2012/0125089 | A1 | 5/2012 | Kim et al. | |
| 2012/0234294 | A1* | 9/2012 | Nakamura | F02D 9/06 |
| | | | | 123/436 |
| 2013/0054120 | A1* | 2/2013 | Yamada | F02D 41/247 |
| | | | | 701/104 |
| 2013/0325300 | A1* | 12/2013 | Walter | F02D 41/123 |
| | | | | 701/104 |
| 2014/0202431 | A1* | 7/2014 | Katsura | F02D 1/06 |
| | | | | 123/447 |

FOREIGN PATENT DOCUMENTS

| | | |
|---|---|---|
| GB | 2500890 A | 10/2013 |
| JP | 2009-057910 A | 3/2009 |

* cited by examiner

CONTROL APPARATUS FOR OPERATING A FUEL INJECTOR

CROSS REFERENCE TO RELATED APPLICATION

This application claims priority to Great Britain Patent Application No. 1316871.1 filed Sep. 23, 2013, which is incorporated herein by reference in its entirety.

TECHNICAL FIELD

The technical field generally relates to a control apparatus for operating a fuel injector provided for injecting fuel into an internal combustion engine, such as for example an internal combustion engine of an automotive vehicle.

BACKGROUND

It is known that the internal combustion engine of an automotive vehicle usually includes an engine block defining at least one cylinder having a piston, and a cylinder head that closes the cylinder and cooperates with the piston to define a combustion chamber. A fuel and air mixture is disposed in the combustion chamber and ignited, resulting in hot expanding exhaust gasses causing reciprocal movements of the piston which rotate a crankshaft.

The fuel is generally provided by at least one fuel injector which may be located inside the combustion chamber. The fuel injector receives the fuel from a fuel rail, which is in fluid communication with a high pressure fuel pump that increases the pressure of the fuel received from a fuel source. The fuel injector is connected to an electronic control unit (ECU) which is configured to determine the fuel quantity to be injected inside the combustion chamber during each engine cycle and to operate the fuel injector accordingly.

To reduce polluting emissions and combustion noises, the fuel quantity to be injected in the combustion chamber is conventionally split into a plurality of injections, according to a multiple fuel injection pattern. Typical multiple injection patterns include preliminary injections, known as pilot injections, followed by one or more main injections, after and post injections.

Pilot injections are provided for injecting small quantities of fuel before a main injection, in order to reduce the explosiveness of the main injection which reduces vibration and optimizes fuel consumption.

To perform each pilot injection, the electronic control unit energizes the fuel injector for a given time, conventionally referred as energizing time (ET), thereby causing the fuel injector to open and a proportional quantity of fuel to be injected into the combustion chamber. The value of this energizing time is usually predetermined during an experimental activity performed on a test bench, and then stored as a calibration parameter in a memory system of the electronic control unit.

A drawback of this approach is that the value of the energizing time stored inside the memory system is predetermined using a nominal fuel injection system, whereas the operation of the real fuel injection system of an internal combustion engine is generally affected by both production spread and aging of its components, particularly of the fuel injectors. Therefore, the fuel quantity actually injected by a fuel injector in response to the nominal value of the energizing time generally drifts from the expected quantity, thereby causing combustion noise increase and worse exhaust emissions.

More specifically, if a pilot injection actually injects a fuel quantity that is less than the expected quantity, an engine noise increase usually occurs. On the contrary, if a pilot injection actually injects a fuel quantity that is greater than the expected quantity, the engine produces an increased quantity of particulate material. If a pilot injection misfires, besides the noise increase that inevitably occurs, $NO_x$ emissions may also be increased.

In order to prevent these disadvantages, fuel compensation strategies are implemented by the electronic control unit. These compensation strategies conventionally provide for periodically testing each fuel injector during its lifetime, in order to learn the fuel quantity drift. The learned fuel quantity drift is then used to adjust the injector energizing time in order to have repetitive performance and increased accuracy in the fuel injected quantity along the life of the injector.

These tests are performed when the internal combustion engine is running under a fuel cut-off condition, namely a condition where the electronic control unit cuts the fuel supply off, for example when the automotive vehicle is moving and the driver releases the pressure on the accelerator pedal.

During these fuel cut-off conditions, a known learning strategy provides for the electronic control unit to set the pressure within the fuel rail at a predetermined value, and then to command the fuel injector to perform a test injection in one of the cylinder of the engine, while the other fuel injectors are kept de-energized. This test injection is performed by energizing the fuel injector for the nominal value of the energizing time that should correspond to a target value of the fuel injected quantity, particularly a small fuel quantity (e.g., 1 $mm^3$ of fuel). The combustion of this small quantity of fuel causes a variation of the engine torque, which is not perceived by the driver but can be measured with a sensor, for example with a crankshaft speed sensor. Since the engine torque is proportional to the fuel quantity actually injected during the test injection, its measured value is compared with a predetermined reference value that quantifies the engine torque that would be measured, if the fuel injected quantity were equal to the target fuel quantity. If the measured value of the engine torque is different from the reference value thereof, the electronic control unit repeats the test one or more times using different values of the energizing time, until an actual value of the energizing time is found that actually produces the reference value of the engine torque. The difference between the actual value of the energizing time and the nominal value thereof is then calculated and stored in a memory system, so that it can be retrieved by the electronic control unit and used to correct the energizing time of the pilot injections during the normal operation of the internal combustion engine.

This known fuel injector learning strategy, which is generally repeated for different values of the fuel rail pressure and for each fuel injector individually, is an iterative search that can achieve a very accurate learning of the correction to be applied to the nominal value of the energizing time to compensate for the fuel quantity drift of the tested fuel injector. However, it requires an unpredictable number of iterations to determine the actual value of the energizing time, so that the fuel injector learning phase may require a very long time to be completed, which does not always comply with the strictest OBD (On Board Diagnostic) legislation requirements.

Other fuel injector learning strategies have been proposed, which are potentially faster. One of these strategies provides for performing several test injections, using different values of the energizing time, and for calculating the quantity of fuel actually injected during each of these test injections. The values of the fuel injected quantity are conventionally calculated as a function of corresponding measured values of the engine torque. The calculated values of the fuel quantity and their correspondent energizing time values are then used in an interpolation process, which provides for determining an injector characteristic function correlating the energizing time to the injected fuel quantity, and then for applying the target value of the fuel quantity to the characteristic function to determine the actual value of the energizing time.

A drawback of this alternative strategy is that the values of the energizing time used to perform the test injections are chosen so as to disperse the quantities of fuel actually injected by the fuel injector around the target fuel quantity. This means that a group of these test injections inject fuel quantities that are smaller than the target fuel quantity. Since the target fuel quantity is a small quantity (e.g., 1 mm$^3$), the fuel quantities injected by that group of test injections are so small that their effects on the engine torque are almost negligible. As a consequence, the measurements of the engine torque generated by these test injections may be heavily affect by noises that disturb the sensor signal, including electrical and mechanical noises, so that the following calculation of the injected fuel quantities, determination of the characteristic function and interpolation of the actual value of the energizing time may be unreliable.

SUMMARY

An aim of the present disclosure is to provide a solution for learning the fuel quantity drift of a fuel injector in the small quantity area, which is able to solve or at least positively reduce the above mentioned drawbacks of the conventional solutions. Another aim is that of achieving this goal with a simple, rational and rather inexpensive solution.

An embodiment of the present disclosure provides a control apparatus for operating a fuel injector in fluid communication with a fuel rail to inject fuel into an internal combustion engine, wherein the control apparatus includes an electronic control unit configured to identify when the engine is running under a fuel cut-off condition, and then perform a learning procedure to determine an actual value of energizing time that causes the fuel injector to inject a target fuel quantity. During the learning procedure the electronic control unit regulates the fuel rail pressure at a predetermined pressure value, energizes the fuel injector to perform several test injections with different energizing time values, measures an engine torque value caused by the test injection for each one of the test injections, and uses the measured engine torque values and their correspondent energizing time values to extrapolate the actual value of the energizing time as the value that corresponds to a reference value of engine torque that is consistent with the target fuel quantity. The energizing time value of each one of the test injections is predetermined for the fuel injector to inject a fuel quantity that is bigger than the target fuel quantity.

This extrapolation based strategy advantageously allows a determination of the actual value of the energizing time with a predetermined and fixed number of test injections, for example with only three test injections, thereby resulting faster than conventional iteration strategies.

Because the test injections are all set to inject fuel quantities that are greater than the target one, their effects on the engine torque are quite clearly perceivable by the sensors. As a consequence, the measurements of the engine torque caused by all of these test injections are less affected by the noises disturbing the sensor signal, thereby leading to an actual value of the energizing time that may be more reliable than that provided by conventional interpolation based strategies.

According to an aspect of the control apparatus, the energizing time value of each one of the test injections may be predetermined to cause the fuel injector to inject a fuel quantity that satisfies the following relation:

$$1.4 \cdot Q_{tar} < Q$$

wherein $Q_{tar}$ is the target fuel quantity and Q is the fuel quantity injected during the test injection. This aspect of the present disclosure has the advantage of further improving the reliability of the engine torque measurements.

According to a more specific aspect of the control apparatus, the energizing time value of each one of the test injections may be predetermined to cause the fuel injector to inject a fuel quantity that satisfies the following relation:

$$Q < 4 \cdot Q_{tar}$$

wherein $Q_{tar}$ is the target fuel quantity and Q is the fuel quantity injected during the test injection. This aspect of the present disclosure has the advantage of preventing that the test injections exits from the so called small quantity area and that their torque effects can be perceived by the driver.

According to another aspect of the control apparatus, the extrapolation of the actual value of energizing time may provide for the electronic control unit to calculate a ratio between each one of the measured values of engine torque and the reference value thereof, and to use the calculated values of the ratio and their correspondent energizing time values to extrapolate the actual value of the energizing time as the as the energizing time value that corresponds to a ratio having unitary value. This aspect of the present disclosure is advantageous because reduces the computational effort required to carry out the strategy.

According to another aspect of the control apparatus, the electronic control unit is configured to perform the extrapolation may be a linear or a polynomial (e.g. quadratic) or an exponential extrapolation. This aspect of the present disclosure has the advantage of yielding reliable results with a low computational effort.

According to another aspect of the control apparatus, the electronic control unit may be configured to measure the engine torque values by means of a crankshaft position sensor of the engine. The advantage of this aspect of the present disclosure is that there is a stable relation between the speed variations of the crankshaft and the engine torque.

According to another aspect of the control apparatus, the electronic control unit may be also configured to identify a fault of the fuel injector if the actual value of the energizing time is outside a predetermined range of allowable values. This aspect of the present disclosure is advantageous because it allows a fast detection of a faulty fuel injector.

According to another aspect of the control apparatus, the electronic control unit may be also configured to store the actual value of the energizing time in a memory system. The advantage of this aspect of the present disclosure is that of allowing the actual value of the energizing time to be used for correcting small fuel injections during the normal operation of the engine.

According to another aspect of the control apparatus, the electronic control unit may be also configured to repeat the learning procedure several times, setting each time a different value of the fuel rail pressure. The advantage of this aspect of the present disclosure is to create a complete map of energizing time actual values to be used for correcting small fuel injections during the normal operation of the engine.

Another embodiment of the present disclosure provides a method of operating a fuel injector in fluid communication with a fuel rail to inject fuel into an internal combustion engine which includes identifying when the engine is running under a fuel cut-off condition, and then performing a learning procedure to determine an actual value of energizing time that causes the fuel injector to inject a target fuel quantity. The learning procedure provides for regulating the fuel rail pressure at a predetermined pressure value, energizing the fuel injector to perform several test injections with different energizing time values, measuring, for each one of the test injections, an engine torque value caused by the test injection, and using the measured engine torque values and their correspondent energizing time values to extrapolate the actual value of the energizing time as the value that corresponds to a reference value of engine torque that is consistent with the target fuel quantity. The energizing time value of each one of the test injections is predetermined for the fuel injector to inject a fuel quantity that is bigger than the target fuel quantity.

This embodiment of the present disclosure achieves basically the same advantages of the control system described above, in particular those of resulting faster than conventional iteration strategies and more reliable than conventional interpolation strategies.

According to an aspect of the method, the energizing time value of each one of the test injections may be predetermined to cause the fuel injector to inject a fuel quantity that satisfies the following relation:

$$1.4 \cdot Q_{tar} < Q$$

wherein $Q_{tar}$ is the target fuel quantity and $Q$ is the fuel quantity injected during the test injection. This aspect of the present disclosure has the advantage of further improving the reliability of the engine torque measurements.

According to a more specific aspect of the method, the energizing time value of each one of the test injections may be predetermined to cause the fuel injector to inject a fuel quantity that satisfies the following relation:

$$Q < 4 \cdot Q_{tar}$$

wherein $Q_{tar}$ is the target fuel quantity and $Q$ is the fuel quantity injected during the test injection. This aspect of the present disclosure has the advantage of preventing that the test injections exits from the so called small quantity area and that their torque effects can be perceived by the driver.

According to another aspect of the method, the extrapolation of the actual value of energizing time may calculate a ratio between each one of the measured values of engine torque and the reference value thereof. The calculated values of the ratio and their correspondent energizing time values are used to extrapolate the actual value of the energizing time as the as the energizing time value that corresponds to a ratio having unitary value. This aspect of the present disclosure is advantageous because reduces the computational effort required to carry out the strategy.

According to another aspect of the method, the extrapolation may be a linear or a polynomial (e.g. quadratic) or an exponential extrapolation. This aspect of the present disclosure has the advantage of yielding reliable results with a low computational effort.

According to another aspect of the method, the engine torque values may be measured by means of a crankshaft position sensor of the engine. The advantage of this aspect of the present disclosure is that there is a stable relation between the speed variations of the crankshaft and the engine torque.

According to another aspect, the method unit may provide for identifying a fault of the fuel injector if the actual value of the energizing time is outside a predetermined range of allowable values. This aspect of the present disclosure is advantageous because it allows a fast detection of a faulty fuel injector.

According to another aspect, the method may provide for storing the actual value of the energizing time in a memory system. The advantage of this aspect of the present disclosure is that of allowing the actual value of the energizing time to be used for correcting small fuel injections during the normal operation of the engine.

According to another aspect, the method may provide for repeating the learning procedure several times, setting each time a different value of the fuel rail pressure. The advantage of this aspect of the present disclosure is to create a complete map of energizing time actual values to be used for correcting small fuel injections during the normal operation of the engine.

The method can be carried out with the help of a computer program including a program-code for carrying out the method described above, and in the form of a computer program product including the computer program. The method can be also embodied as an electromagnetic signal modulated to carry a sequence of data bits which represent a computer program to carry out the method.

Another embodiment of the present disclosure provides an apparatus for operating a fuel injector in fluid communication with a fuel rail to inject fuel into the internal combustion engine. The apparatus includes means for identifying when the engine is running under a fuel cut-off condition, and means for performing a learning procedure to determine an actual value of energizing time that causes the fuel injector to inject a target fuel quantity. The means for performing the learning procedure includes means for regulating the fuel rail pressure at a predetermined pressure value, means for energizing the fuel injector to perform several test injections with different energizing time values, means for measuring, for each one of the test injections, an engine torque value caused by the test injection, and means for using the measured engine torque values and their correspondent energizing time values to extrapolate the actual value of the energizing time as the value that corresponds to a reference value of engine torque that is consistent with the target fuel quantity. The energizing time value of each one of the test injections is predetermined for the fuel injector to inject a fuel quantity that is bigger than the target fuel quantity.

This embodiment of the present disclosure achieves basically the same advantages of the control system described above, in particular those of resulting faster than conventional iteration strategies and more reliable than conventional interpolation strategies.

According to an aspect of the apparatus, the energizing time value of each one of the test injections may be predetermined to cause the fuel injector to inject a fuel quantity that satisfies the following relation:

$$1.4 \cdot Q_{tar} < Q$$

wherein $Q_{tar}$ is the target fuel quantity and Q is the fuel quantity injected during the test injection. This aspect of the present disclosure has the advantage of further improving the reliability of the engine torque measurements.

According to a more specific aspect of the apparatus, the energizing time value of each one of the test injections may be predetermined to cause the fuel injector to inject a fuel quantity that satisfies the following relation:

$$Q < 4 \cdot Q_{tar}$$

wherein $Q_{tar}$ is the target fuel quantity and Q is the fuel quantity injected during the test injection. This aspect of the present disclosure has the advantage of preventing that the test injections exits from the so called small quantity area and that their torque effects can be perceived by the driver.

According to another aspect of the apparatus, the means for extrapolating the actual value of energizing time may include means for calculating a ratio between each one of the measured values of engine torque and the reference value thereof, and means for using the calculated values of the ratio and their correspondent energizing time values to extrapolate the actual value of the energizing time as the as the energizing time value that corresponds to a ratio having unitary value. This aspect of the present disclosure is advantageous because it reduces the computational effort required to carry out the strategy.

According to another aspect of the apparatus, the extrapolation may be a linear or a polynomial (e.g. quadratic) or an exponential extrapolation. This aspect of the present disclosure has the advantage of yielding reliable results with a low computational effort.

According to another aspect of the apparatus, the means for measuring the engine torque values may include a crankshaft position sensor of the engine. The advantage of this aspect of the present disclosure is that there is a stable relation between the speed variations of the crankshaft and the engine torque.

According to another aspect, the apparatus may include means for identify a fault of the fuel injector if the actual value of the energizing time is outside a predetermined range of allowable values. This aspect of the present disclosure is advantageous because it allows a fast detection of a faulty fuel injector.

According to another aspect, the apparatus may include means for storing the actual value of the energizing time in a memory system. The advantage of this aspect of the present disclosure is that of allowing the actual value of the energizing time to be used for correcting small fuel injections during the normal operation of the engine.

According to another aspect, the apparatus may include means for repeating the learning procedure several times, said means being configured to set each time a different value of the fuel rail pressure. The advantage of aspect of the present disclosure is to create a complete map of energizing time actual values to be used for correcting small fuel injections during the normal operation of the engine.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
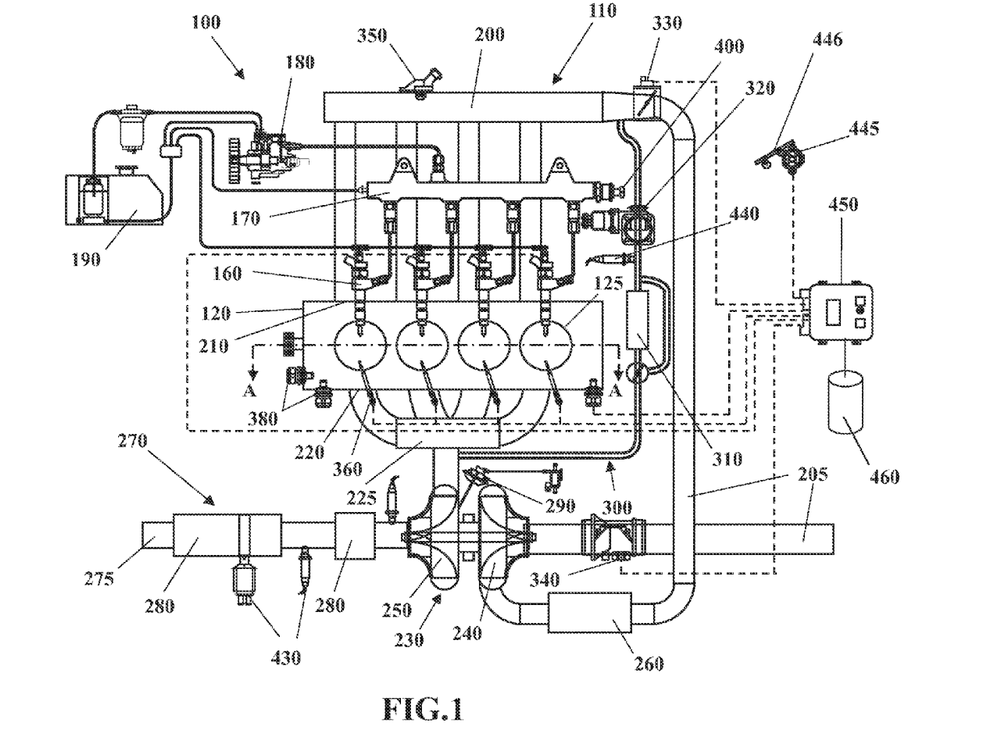
FIG. 1 schematically shows a powertrain of an automotive system.
Figure 2:
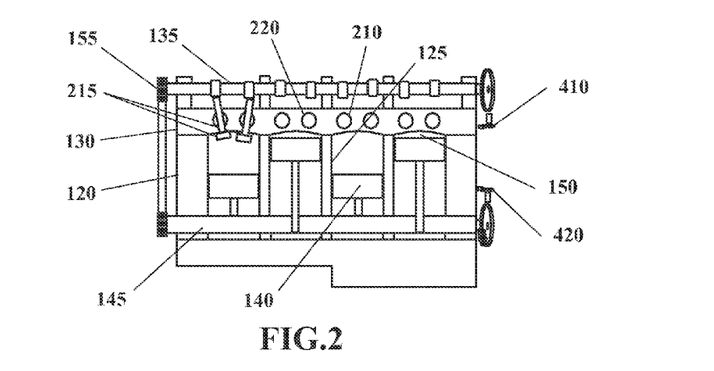
FIG. 2 is the section A-A of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and position sensor 445 of an accelerator pedal 446. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

The ECU 450 is generally configured to carry out many different tasks, one of which is that of periodically checking up the operation of each fuel injector 160 in the small quantity area. To complete this task, the ECU 450 may be configured to perform the method illustrated in the flowchart of FIG. 3.

Figure 3:
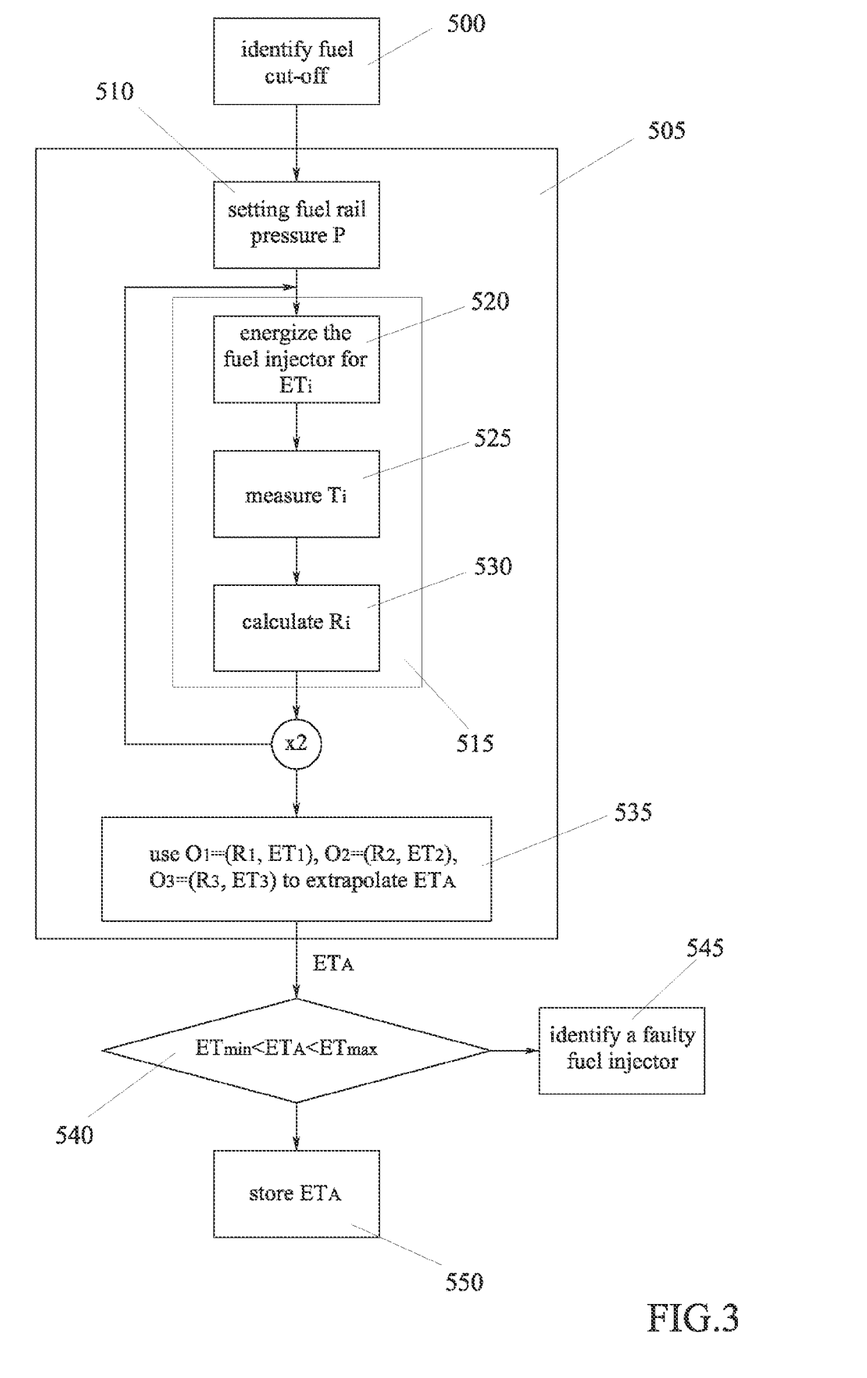
FIG. 3 shows a flowchart of a method for operating the fuel injector according to an embodiment of the present disclosure.

The first step of the method (block 500) is that of identifying when the internal combustion engine 110 is running under a fuel cut-off condition. To do so, the ECU 450 may be configured to monitor the position of the accelerator pedal 446 with the sensor 445, and to identify the fuel cut-off condition when the accelerator pedal 446 is completely released.

When the internal combustion engine 110 is running under a fuel cut-off condition, the method provides for the ECU 450 to perform a learning procedure (globally indicated by the block 505), which is able to determine an actual value $E_A$ of energizing time that causes the fuel injector 160 to inject a small target fuel quantity $Q_{tar}$. The small target fuel quantity $Q_{tar}$ is generally chosen as the fuel quantity that should be injected by a pilot injection. Therefore, the small target fuel quantity $Q_{tar}$ may depend on the specific internal combustion engine 110. However, the small target fuel quantity $Q_{tar}$ may be generally quantified as being smaller than 2.5 mm$^3$, for example it may be equal to 1 mm$^3$.

The learning procedure 505 firstly provides for the ECU 450 to regulate the pressure within the fuel rail 170 at a predetermined value P (block 510). The pressure value P may be determined during an experimental activity on a test bench and then stored in the memory system 460 connected to the ECU 450.

When the fuel rail pressure is stable at the prescribed pressure P, the learning procedure 505 provides for the ECU 450 to operate a test (block 515), whose first step is that of energizing the fuel injector 160 for a predetermined value ET, of energizing time (block 520), so that the fuel injector 160 performs a test injection, while the other fuel injectors are all kept de-energized.

The energizing time value ET, is predetermined so that the fuel quantity Q injected by the fuel injector 160 during the test injection is bigger than the target fuel quantity $Q_{tar}$. More particularly, the energizing time value ET, may be predetermined so that the fuel quantity Q injected by the fuel injector 160 during the test injection satisfies the following relation:

$$1.4 \cdot Q_{tar} < Q < 4 \cdot Q_{tar}.$$

To this purpose, the energizing time value ET, may be predetermined during an experimental activity on a test bench and then stored in the memory system 460 connected to the ECU 450.

The test 515 then provides for the ECU 450 to measure (block 525) a value $T_i$ of the engine torque caused by the test injection. The value $T_i$ of the engine torque may be measured for example with the crankshaft position sensor 420, because there is a direct relation between the speed variation of the crankshaft 145 and the torque generated by the combustion of the injected fuel.

The test 515 finally provides for the ECU 450 to calculate (block 530) a ratio R according to the following equation:

$$R_i = \frac{T_i}{T_{ref}}$$

wherein $R_i$ is the ratio value and $T_{ref}$ is a reference value of engine torque that is consistent with the target fuel quantity $Q_{tar}$, namely a value that is expected to be measured if the fuel injector actually injects the target fuel quantity $Q_{tar}$. In this way, the ratio value $R_i$ and the corresponding energizing time value $ET_i$ represent a real operating point $O_i=(R_i, T_i)$ of the fuel injector 160.

According to the learning procedure 505, the ECU 450 repeats the entire test 515 for a predetermined and fixed number of times, each time using a value ET, of the energizing time that is different from the others but that satisfies the above mentioned condition on the fuel injected quantity, in order to acquire a predetermined and fixed number of real operating points of the fuel injector 160.

Figure 4:
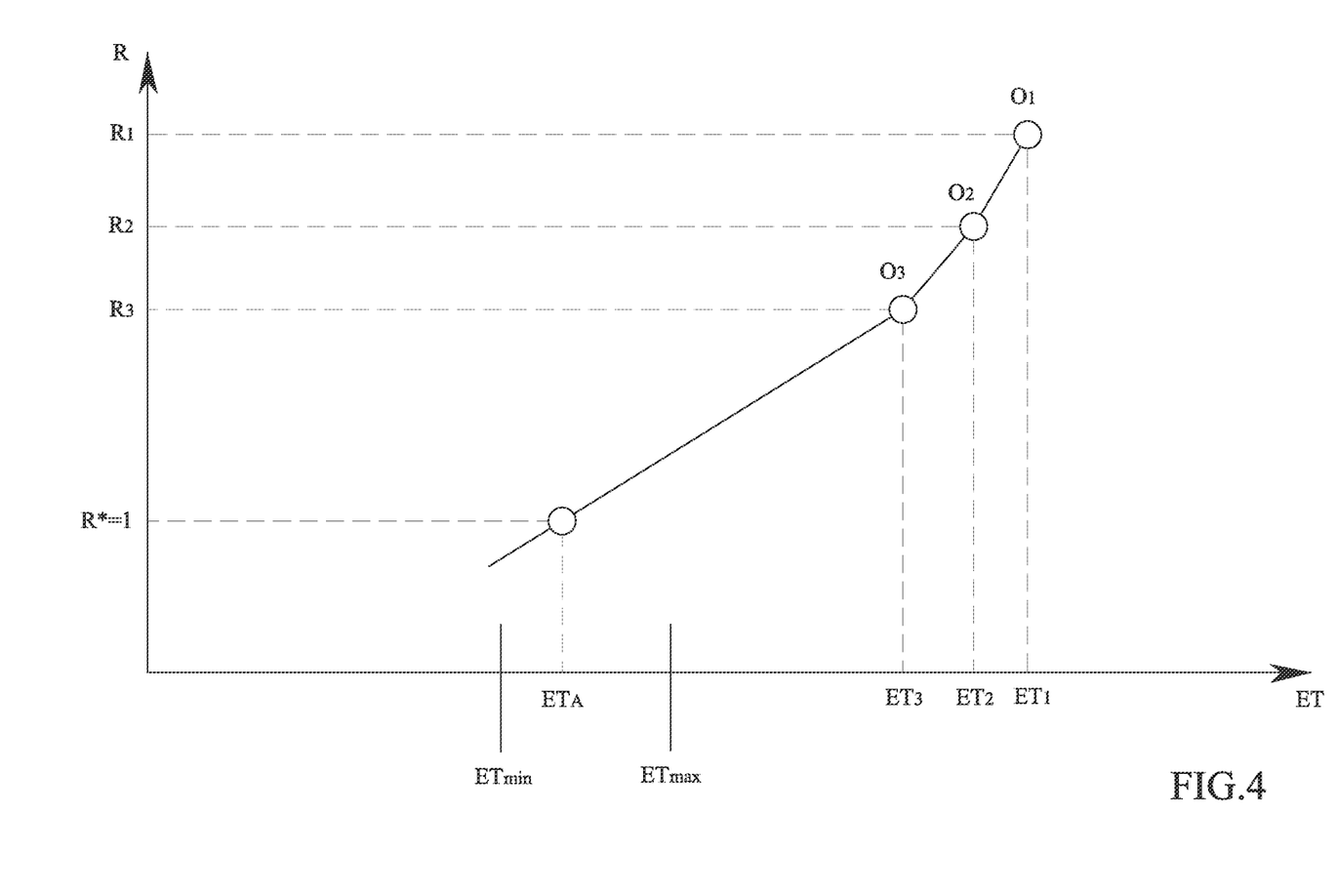
FIG. 4 shows a graph representing the extrapolation of the actual value of the energizing time that corresponds to a target small quantity.

In the example here described, the learning procedure 505 provides for the ECU 450 to repeat the test 515 twice, in order to globally measure three values $T_1$, $T_2$, $T_3$ of the engine torque corresponding to three different values $ET_1$, $ET_2$, $ET_3$ of the energizing time, to calculate three values $R_1$, $R_2$ and $R_3$ of the ratio, and then to acquire three real operating points $O_1=(R_1, ET_1)$, $O_2=(R_2, ET_2)$, $O_3=(R_3, ET_3)$ of the fuel injector 160, as represented in the graph of FIG. 4. However, it should be understood that other embodiments of the learning procedure may provide for acquiring a different number of real operating points.

The learning procedure 505 then provides for the ECU 450 to perform an extrapolation (block 535) based on the real operating points $O_1=(R_1, ET_1)$, $O_2=(R_2, ET_2)$, $O_3=(R_3, ET_3)$, in order to estimate the actual value $E_A$ of the energizing time as the energizing time value that corresponds to a ratio $R^*$ having unitary value: $R^*=1$. As represented in FIG. 4, this extrapolation may generally include the steps of creating a curve through the real operating points $O_1=(R_1, ET_1)$, $O_2=(R_2, ET_2)$, $O_3=(R_3, ET_3)$, of extending the resulting curve beyond these real operating points $O_1=(R_1, ET_1)$, $O_2=(R_2, ET_2)$, $O_3=(R_3, ET_3)$, and finally of reading on the extended curve the energizing time value $ET_A$ corresponding to the ratio $R^*$. Depending on the kind of curve used in these steps, the extrapolation can be a linear extrapolation or a polynomial extrapolation or an exponential extrapolation. In general, the extrapolation curve may be determined during an experimental activity performed on a test bench, as the curve that best fits the characteristic of the fuel injector 160 at the prescribed fuel rail pressure value P.

At this point, the method may provide to compare (block 540) the energizing time value $ET_A$ with a predetermined range of values that can be considered allowable for the target fuel quantity $Q_{tar}$. This range of allowable value may be defined as included between a minimum threshold value $ET_{min}$ and a maximum threshold value $ET_{max}$. These threshold values $ET_{min}$ and $ET_{max}$ may be determined during an experimental activity performed on a test bench, and then stored in the memory system 460.

If the energizing time value $ET_A$ is outside the range of allowable value ($ET_{min}$, $ET_{max}$), namely is smaller than the minimum threshold value $ET_{min}$ or bigger than the maximum threshold value $ET_{max}$, the method may provide for the ECU 450 to identify that the fuel injector 160 if faulty (block 545), thereby allowing the ECU 450 to take the necessary countermeasures.

If the energizing time value $ET_A$ is within the range of allowable value ($ET_{min}$, $ET_{max}$), the method may provide for the ECU 450 to store (block 550) the energizing time value $ET_A$ in the memory system 460. In this way, the energizing time value $ET_A$ may be retrieved by the ECU 450 and used for correcting small fuel injections performed by the fuel injector 160 during the normal operation of the engine.

In order to create a complete map of energizing time actual values to be used for correcting small fuel injections during the normal operation of the engine, the ECU 450 may be also configured to repeat the entire procedure several times, setting each time a different value of the fuel rail pressure P. In this regard, it should be observed that the extrapolation curve involved in the learning procedure 505 may change depending on the fuel rail pressure value.

The method described above may be repeated periodically during the life time of the fuel injector 160 and may be performed for each one of the fuel injector 160 of the automotive system 100.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A control apparatus for operating a fuel injector in fluid communication with a fuel rail to inject fuel into an internal combustion engine, wherein the control apparatus comprises an electronic control unit configured to:
   identify when the engine is running under a fuel cut-off condition; and
   perform a learning procedure to determine an actual value of energizing time that causes the fuel injector to inject a target fuel quantity in response to the fuel cut-off condition;
   wherein the learning procedure provides for the electronic control unit to:
   regulate the fuel rail pressure at a predetermined pressure value;
   energize the fuel injector to perform several test injections with different energizing time values;
   measure, for each one of the test injections, an engine torque value caused by the test injection;
   use the measured engine torque values and their correspondent energizing time values to extrapolate the actual value of the energizing time as the value that corresponds to a reference value of engine torque that is consistent with the target fuel quantity;
   wherein the energizing time value of each one of the test injections is predetermined for the fuel injector to inject a fuel quantity that is greater than the target fuel quantity;

wherein the energizing time value of each one of the test injections is predetermined to cause the fuel injector to inject a fuel quantity that satisfies the following relation:

$$1.4 Qtar < Q < 4 Qtar$$

wherein Qtar is the target fuel quantity and Q is the fuel quantity injected during the test injection; and the electronic control unit further configured to store the actual value of the energizing time and to use the actual value of the energizing time for correcting small fuel injections during the normal operation of the engine, such that the fuel injector delivers fuel to the engine in accordance with the actual value of the energizing time.

2. The control apparatus according to claim 1, wherein the energizing time value of each one of the test injections is predetermined to cause the fuel injector to inject a fuel quantity that satisfies the following relation:

$$Q < 4 Q\_tar$$

wherein Qtar is the target fuel quantity and Q is the fuel quantity injected during the test injection.

3. The control apparatus according to claim 1, wherein the extrapolation of the actual value of energizing time provides for the electronic control unit to:

calculate a ratio (R) between each one of the measured values (Ti) of engine torque and the reference value (To) thereof; and use the calculated values (Ri) of the ratio and their correspondent energizing time values (ET,) to extrapolate the actual value (ETA) of the energizing time as the as the energizing time value that corresponds to a ratio (R*) having unitary value.

4. The control apparatus according to claim 1, wherein the electronic control unit is configured to perform the extrapolation as a linear or a polynomial or an exponential extrapolation.

5. The control apparatus according to claim 1, wherein the electronic control unit is configured to measure the engine torque values with a crankshaft position sensor of the engine.

6. The control apparatus according to claim 1, wherein the electronic control unit is configured to identify a fault of the fuel injector if the actual value of the energizing time is outside a predetermined range of allowable values.

7. The control apparatus according to claim 1, further comprising a memory system configured to store the actual value of the energizing time from the electronic control unit.

8. The control apparatus according to claim 1, wherein the electronic control unit is configured to repeat the learning procedure several times, setting a different value of the fuel rail pressure each time the learning procedure is repeated.

9. A method of operating a fuel injector in fluid communication with a fuel rail to inject fuel into an internal combustion engine, wherein the method comprising:

identifying when the engine is running under a fuel cut-off condition; and in response to the fuel cut-off condition, performing a learning procedure to determine an actual value of energizing time that causes the fuel injector to inject a small target fuel quantity;

wherein the learning procedure includes:

regulating the fuel rail pressure at a predetermined value;

energizing the fuel injector to perform several test injections with different values of the energizing time;

measuring, for each one of the test injections, a value of engine torque caused by the test injection;

using the measured values of engine torque and their correspondent energizing time values to extrapolate the actual value of the energizing time as the energizing time value that corresponds to a reference value of engine torque that is consistent with the target fuel quantity;

wherein the energizing time value of each one of the test injections is predetermined to cause the fuel injector to inject a fuel quantity whose value is bigger than the target value thereof;

wherein the energizing time value of each one of the test injections is predetermined to cause the fuel injector to inject a fuel quantity that satisfies the following relation:

$$1.4 Qtar < Q < 4 Qtar$$

wherein Qtar is the target fuel quantity and Q is the fuel quantity infected during the test injection; and storing the actual value of the energizing time in a memory;

correcting small fuel injections during the normal operation of the engine in accordance with the actual value of the energizing time, and delivering a corrected fuel amount to the engine via the injector in accordance with the actual value of the energizing time.

10. A non-transitory computer program comprising a computer-code suitable for performing the method according to claim 9.

11. A non-transitory computer program product comprising a microprocessor configured to execute a computer-code for performing the method according to claim 9.

12. A non-transitory computer readable medium comprising a computer-code suitable for programming a microprocessor to perform the method according to claim 9.

* * * * *